United States Patent [19]

Bruno et al.

[11] E Re. 30,194

[45] Reissued Jan. 15, 1980

[54] HIGH FREQUENCY COAXIAL CABLE

[75] Inventors: Saverio T. Bruno, Danbury; Norbert J. Sladek, Fairfield, both of Conn.

[73] Assignee: Bunker Ramo Corporation, Oak Brook, Ill.

[21] Appl. No.: 844,323

[22] Filed: Oct. 11, 1977

Related U.S. Patent Documents

Reissue of:

[64] Patent No.: 3,912,850
Issued: Oct. 14, 1975
Appl. No.: 402,096
Filed: Oct. 1, 1973

[51] Int. Cl.[2] ..... H01B 11/18

[52] U.S. Cl. ..... 174/28; 174/102 D; 174/109; 174/126 CP; 333/239

[58] Field of Search ..... 174/28, 29, 111, 126, 174/126 CP, 128, 129 R, 129 B, 130, 113, 119 R, 119 C, 102 D, 106 D, 106 R, 108, 109; 333/95 R, 95 A, 95 S

[56] References Cited

U.S. PATENT DOCUMENTS

| | | | |
|---|---|---|---|
| 2,189,091 | 2/1940 | Unterbusch | 174/106 R X |
| 2,204,737 | 6/1940 | Swallow et al. | 174/28 |
| 2,337,556 | 12/1943 | Hosking | 174/106 X |
| 2,437,482 | 3/1948 | Salisbury | 174/28 X |
| 2,890,263 | 6/1959 | Brandes et al. | 174/29 |
| 3,173,990 | 3/1965 | Lamons | 174/102 D |
| 3,271,506 | 9/1966 | Martin et al. | 174/28 |
| 3,394,400 | 7/1968 | Lamons | 174/102 D |
| 3,582,536 | 6/1971 | Miller | 174/102 D |
| 3,585,270 | 6/1971 | Trump | 174/28 X |
| 3,683,103 | 8/1972 | Mancino | 174/119 C |
| 3,745,232 | 7/1973 | Johnson et al. | 174/102 D X |

FOREIGN PATENT DOCUMENTS

| | | | |
|---|---|---|---|
| 395891 | 5/1933 | Belgium | 174/28 |
| 6609148 | 9/1963 | Fed. Rep. of Germany | 174/28 |
| 761854 | 1/1934 | France | 174/28 |
| 841517 | 5/1939 | France | 174/28 |
| 356437 | 2/1938 | Italy | 174/106 D |
| 43423 | 6/1938 | Netherlands | 174/28 |
| 570379 | 7/1945 | United Kingdom | 174/28 |

*Primary Examiner*—Arthur T. Grimley
*Attorney, Agent, or Firm*—F. M. Arbuckle; P. Ertel

[57] ABSTRACT

A high frequency coaxial cable exhibiting a low insertion loss and a low reflection coefficient, and incorporating an improved construction providing for convenient adjustment of impedance.

10 Claims, 3 Drawing Figures

FIG.1
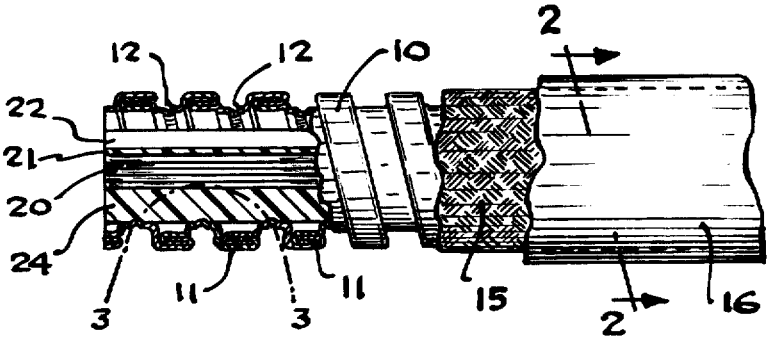
FIG.2
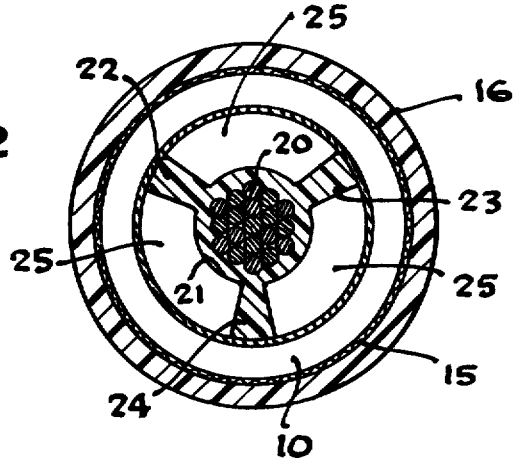
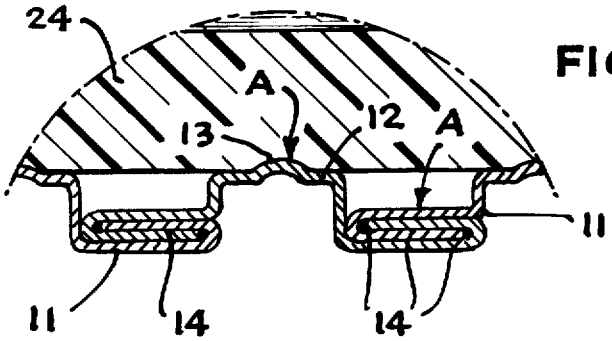
FIG.3

HIGH FREQUENCY COAXIAL CABLE

Matter enclosed in heavy brackets [ ] appears in the original patent but forms no part of this reissue specification; matter printed in italics indicates the additions made by reissue.

BACKGROUND OF THE INVENTION

This invention relates generally to coaxial cables and more particularly concerns a coaxial cable with a low reflection coefficient and low insertion loss.

In the transmission of high-frequency signals, particularly in the gigahertz range, the structure of transmission cables is extremely critical. Moreover, such cables are often subject to flexure and other physical shocks which make the physical arrangement of the components even more critical.

Thus, it is desired to provide a transmission line having low insertion loss and a low reflection coefficient (VSWR), in a cable that will provide a stable VSWR and insertion loss under flexure and other shock conditions.

One of the problems in constructing such a coaxial cable is meeting required critical electrical tolerances. For example, if it is desired to produce a coaxial cable with a characteristic impedance of fifty ohms plus or minus one ohm, it is often difficult to vary the conductors or dielectric to provide an impedance within that range. Accordingly with the present invention, while producing the cable, routine tests can be run and a detent can be varied slightly to correct the impedance to within the desired range. Thus, a detent can easily be pressed into corrugated outer conductor elements before assembly or an assembled cable without its protective wire mesh braid and plastic outer jacket can be further compressed to provide the desired characteristic impedance.

SUMMARY OF THE INVENTION

A high frequency coaxial cable constructed in accordance with the invention includes a corrugated outer conductor with spaced interior convolutions presenting flat inner surfaces, an inner conductor disposed axially within the outer conductor, a dielectric around the inner conductor with axially aligned arms extending to the outer conductor, and inwardly extending detents spaced along the flat inner surfaces of the outer conductor in compressive engagement with the arms of the dielectric member to lock the dielectric member in a desired position and to form a minimum inner diameter of the outer conductor.

BRIEF DESCRIPTION OF THE DRAWINGS

FIG. 1 is a partial sectional view of a coaxial cable comprising one embodiment of the present invention;

FIG. 2 is a sectional view of the cable taken approximately along line 2—2 of FIG. 1; and, FIG. 3 is an enlarged view of an element of the cable, taken as indicated by outline 3—3 in FIG. 1.

DETAILED DESCRIPTION OF THE INVENTION

FIG. 1 shows a coaxial cable constructed in accordance with one embodiment of the invention and comprising a corrugated outer conductor 10 with interlocking portions 11 and interior convolutions 12. Interior convolutions 12 have essentially flat inner surfaces which are better seen in FIG. 3. Along each of the inner surfaces is an inwardly extending detent 13, the importance of which will be described later. The interlocking portions 11 of the outer conductor 10 are connected by solder 14. The inside surface of the outer conductor is plated with a high conductivity metal such as silver or gold. The arrows A in FIG. 3 shows essentially where the inner surfaces are silver plated or plated with a high conductivity metal. To provide additional flexural strength, a wire mesh braid 15 and a plastic outer jacket 16 surround the outer conductor 10.

An inner conductor 20 is disposed coaxially within the outer conductor 10. A dielectric member 21 is molded around the inner conductor 20 and includes arms 22, 23 and 24 extending radially outwardly from the inner conductor and pressing against the outer conductor 10. Preferably, the dielectric member 21 is made of polytetrafluorothylene, though other dielectric materials ca be used. The space 25 not occupied by the dielectric member 21 is filled with air, which also serves as a dielectric.

A feature of the invention is the inwardly extending detent 13, which is spaced along the flat inner surface 12 of the outer conductor 10. By varying or selecting the inward projection or radial position of the detent 13, the effective inner diameter of the outer conductor 10 will be varied and, accordingly, the impedance or electrical characteristic of the coaxial cable will be changed or controlled accordingly.

Thus, as seen in FIGS. 1, 2 and 3, the outer conductor 10 comprises a series of spirally wound adjacent turns with the wall portion of each turn between opposite edges of each turn offset radially inwardly from the opposite edges. The opposite edges of each turn are in folded back overlapping radially spaced relationship with an adjacent portion of each edge for nestingly receiving there-between the edge of the adjacent turn to interlock the adjacent turns. Soldering the interlocked edges and silver plating the inner surfaces of the outer conductor provides a continuous metal or conductive path between turns. The spirally extending detent or detent means 13 is formed along the radially inwardly spaced surface of the outer conductor and it engages the radially outwardly spaced end surface of the axially and radially extending equi-circumferentially spaced arms 22, 23 and 24 of the dielectric member 21.

The outer conductor 10 provides a path which is continuous to RF signals. Preferably the center conductor 20 consists of silver plated stranded wire, though a solid conductor may be used if desired. The air-polytetrafluorothylene construction lowers the dielectric constant and decreases the dielectric losses of the cable.

In order to obtain optimum performance, the diameter of the outer conductor 10 should be consistent and the width of the convolutions should be equal.

The core dielectric member 21 is locked to the outer conductor 10 by means of mechanical compression. This procedure keeps the core and its center conductor 20 from moving relative to the outer conductor 10. This provides excellent alignment even when the cable is subjected to flexure or impact.

The impedance of the cable is controlled by the amount of compression of the outer diameter. The impedance of the coaxial cable is calculated from the equation:

$$Z = \frac{138}{\sqrt{E}} \log_{10} \frac{DM}{ID}$$

where DM is the mean diameter of the outer conductor inner diameter, ID is the outer diameter of the inner conductor and E is the effective dielectric constant of the core components.

The insertion loss of the cable is computed by the summation of the inner conductor loss, the dielectric loss, and the outer conductor loss. The inner conductor loss and dielectric loss are computed by using standard microwave equations for insertion loss. The outer conductor loss is derived from standard equations, except that the added transmission line length due to the convolutions must be incorporated into the calculations. The cable provides a low reflection coefficient (VSWR), high electrical phase stability under stress, and high consistency in phase tracking. As an example of the low insertion loss, measurements of less than 0.35 dB per foot at 16 GHz, less than 0.14dB per foot at 8 ghz, and less than 0.065 dB per foot at 2 GHz have been recorded for a 50 ohm transmission line.

In production of a coaxial cable in accordance with one embodiment of the invention, the detent in the outer conductor can be formed prior to assembly to conform to calculated standards. An on-line assembly procedure includes, forming a corrugated outer conductor with spaced interior convolutions presenting flat inner surfaces, forming a dielectric core around an inner conductor, the dielectric core having a plurality of axially aligned arms, inserting the inner conductor and dielectric core axially within the outer conductor, and forming a plurality of inwardly extending detents spaced along the flat inner surfaces of the outer conductor to form a minimum inner diameter of said outer conductor.

The detents can be formed while forming the outer conductor or the detents can be added or varied after the inner conductor, outer conductor, and dielectric core are assembled. Thus, after assembly of these three elements, the impedance of the cable can be measured and the projection of the detent can be varied to vary the impedance to the desired range, the cable can then be enclosed in the wire mesh and plastic jacket. When silver plating the inside surface of the outer conductor, this step is preferably done before the assembly of the inner conductor, outer conductor, and dielectric core.

We claim:

1. A high frequency coaxial cable, comprising;

an outer conductor with spaced interior convolutions presenting inner surfaces;

at least one inner conductor disposed axially within the outer conductor;

a dielectric member around the inner conductor with a plurality of axially aligned arms extending to the outer conductor; and, at least one inwardly extending detent spaced along the inner surfaces of the outer conductor in compressive engagement with the arms of the dielectric member to lock said member in a desired position with the radial position of said detent selected in accordance with a desired electrial characteristic of said cable to control said electrical characteristic.

2. A cable as in claim 1 wherein said outer conductor is corrugated and said detent extends around the perimeter and axially along said outer conductor surface.

3. A cable as in claim 1 wherein said inner conductor includes a plurality of silver coated strands of wire.

4. A cable as in claim 2 wherein said outer conductor includes interlocked portions and is silver plated on its inner surface.

5. A cable as in claim 2 wherein said corrugated outer [connector] *conductor* includes interlocking portions and is soldered at its interlocking portions.

6. A cable as in claim 5 wherein said outer conductor is enclosed by a wire mesh braid and a plastic outer jacket.

7. A coaxial cable for use in transmitting high frequency electrical signals comprising:

at least one inner conductor;

an outer conductor encircling said inner conductor and spaced radially outwardly of said inner conductor;

a dielectric member extending axially of said inner and outer conductors secured to said inner conductor and having a plurality of axially extending circumferentially spaced arms extending radially toward said outer conductor; and detent means on said outer conductor extending radially inwardly from said outer conductor in movement restraining relationship to said arms for holding said dielectric member and inner conductor against movement relative said outer conductor with the radial position of said detent means located for controlling an electrical characteristic of said cable.

8. The coaxial cable claimed in claim 7 in which said outer conductor is formed in a series of continuous turns having interlocked opposite edges and a wall portion in each turn intermediate said opposite edges is offset radially inwardly of said opposite edges with said detent means being formed in said wall portion for engaging the radially outward end of each of said arms.

*9. A high frequency coaxial cable, comprising:*

*an outer conductor with spaced interior convolutions presenting inner surfaces;*

*at least one inner conductor disposed axially within said outer conductor;*

*a dielectric member around said inner conductor and extending to said outer conductor; and*

*at least one inwardly extending detent spaced along said inner surfaces of said outer conductor in compressive engagement with said dielectric member to lock said member in a desired position with the position of said detent selected in accordance with a desired electrical characteristic of said cable to control said electrical characteristic.*

*10. A coaxial cable for use in transmitting high frequency electrical signals comprising:*

*at least one inner conductor;*

*an outer conductor encircling said inner conductor and spaced radially outwardly of said inner conductor;*

*a dielectric member extending axially of said inner and outer conductors secured to said inner conductor; and*

*detent means on said outer conductor extending radially inwardly from said outer conductor in movement restraining relationship to said dielectric member for holding said dielectric member and said inner conductor against movement relative to said outer conductor with the radial position of said detent means located for controlling an electrical characteristic of said cable.*

* * * * *